United States Patent [19]
Horton

[11] 3,786,892

[45] Jan. 22, 1974

[54] SAFETY CUT-OFF DEVICE FOR IGNITION SWITCH

[76] Inventor: George F. Horton, Rt. 2, Box 718, Fort Worth, Tex. 76135

[22] Filed: Nov. 29, 1972

[21] Appl. No.: 310,224

[52] U.S. Cl. ................................................ 180/99
[51] Int. Cl............................................ B60k 27/08
[58] Field of Search .......... 180/99, 82, 103; 200/52

[56] References Cited
UNITED STATES PATENTS

| | | | |
|---|---|---|---|
| 1,881,251 | 10/1932 | Tobener | 180/82 |
| 747,370 | 12/1903 | Brisun | 180/99 |
| 2,550,813 | 5/1951 | Hopkins | 180/99 X |
| 2,722,575 | 11/1955 | Dobkins | 180/82 |

*Primary Examiner*—M. Henson Wood, Jr.
*Assistant Examiner*—Gene A. Church
*Attorney, Agent, or Firm*—Arthur F. Zobal; Wofford, Felsman & Fails

[57] ABSTRACT

The specification discloses an ignition switch cut-off device for use on an open type carrier, for example a motor boat, to cut off the engine in the event that the operator is thrown out or falls out of the boat. The cut-off device comprises a control member to be supported in front of the keyhole of the ignition switch housing and having a slot for receiving the ignition switch key when the key is inserted into the keyhole. A housing means is provided for supporting the control member for rotational movement in front of the ignition switch keyhole to allow the key to be inserted through the slot into the ignition switch keyhole and to turn with the key when it is turned to its run and off positions. A flexible pull member is coupled to the control member and is adapted to extend out of the housing means in a manner such that when the key is at its run position and the pull member is pulled, the control member and hence the key will be pulled to its off position to cut off the motor. The pull member is adapted to be coupled to the operator.

5 Claims, 7 Drawing Figures

PATENTED JAN 22 1974

SAFETY CUT-OFF DEVICE FOR IGNITION SWITCH

BACKGROUND OF THE INVENTION

The present invention relates to an ignition switch cut-off device for use in an open top carrier to cut off the motor in the event that the operator is thrown out of or falls out of the carrier.

The operation of open top carriers such as motor boats, tractors, riding mowers, snowmobiles, etc. has resulted in many instances in the operator being thrown out and run over or hit by the driverless carrier. This has been particularly true in the operation of high speed motor boats which may very easily throw the operator out in the event that the boat hits a log or a wave in a certain manner when traveling at a high speed. Since the speed is set by the throttle lever and the direction by the steering wheel or lever, the boat will continue on its path until it runs out of gas or hits an object. If the path set is a curved path, the boat will continue to circle and in many instances has hit the driver previously thrown into the water. Devices have been proposed or built to cut off the engine in the event that the driver is thrown out, however the known devices are expensive, complicated, and difficult to install.

SUMMARY OF THE INVENTION

It is the object of the present invention to provide a simple, effective, and easy-to-install ignition switch cut-off device for use in an open top carrier powered by a motor adapted to operate when the ignition switch key is at a run position and to be turned off when the ignition switch key is turned to an off position. The device comprises control means to be supported in front of the keyhole of the ignition switch housing and which has a slot for receiving the ignition key when the key is inserted into the keyhole. Housing means is provided for supporting the control means for rotational movement in front of the ignition switch keyhole to allow the key to be inserted through the slot into the keyhole and to turn with the key when it is turned to its run and off positions. In addition, a flexible pull means is coupled to the control means and adapted to extend out of the housing means in a manner such that when the key is at its run position and the pull means is pulled, the control means and hence the key will be pulled to its off position.

In one aspect, the pull means comprises a flexible chain or cord adapted to be connected to a person in the boat whereby the key will be pulled to its off position by the cord or chain to turn off the boat's motor in the event that the person is thrown out of or falls out of the boat.

In a further aspect, the housing means comprises a flared opening through which the pull means is adapted to extend for allowing the pull means to be pulled effectively from a plurality of directions to turn the control means and hence the key to its off position.

DETAILED DESCRIPTION OF THE INVENTION

Figure 1:
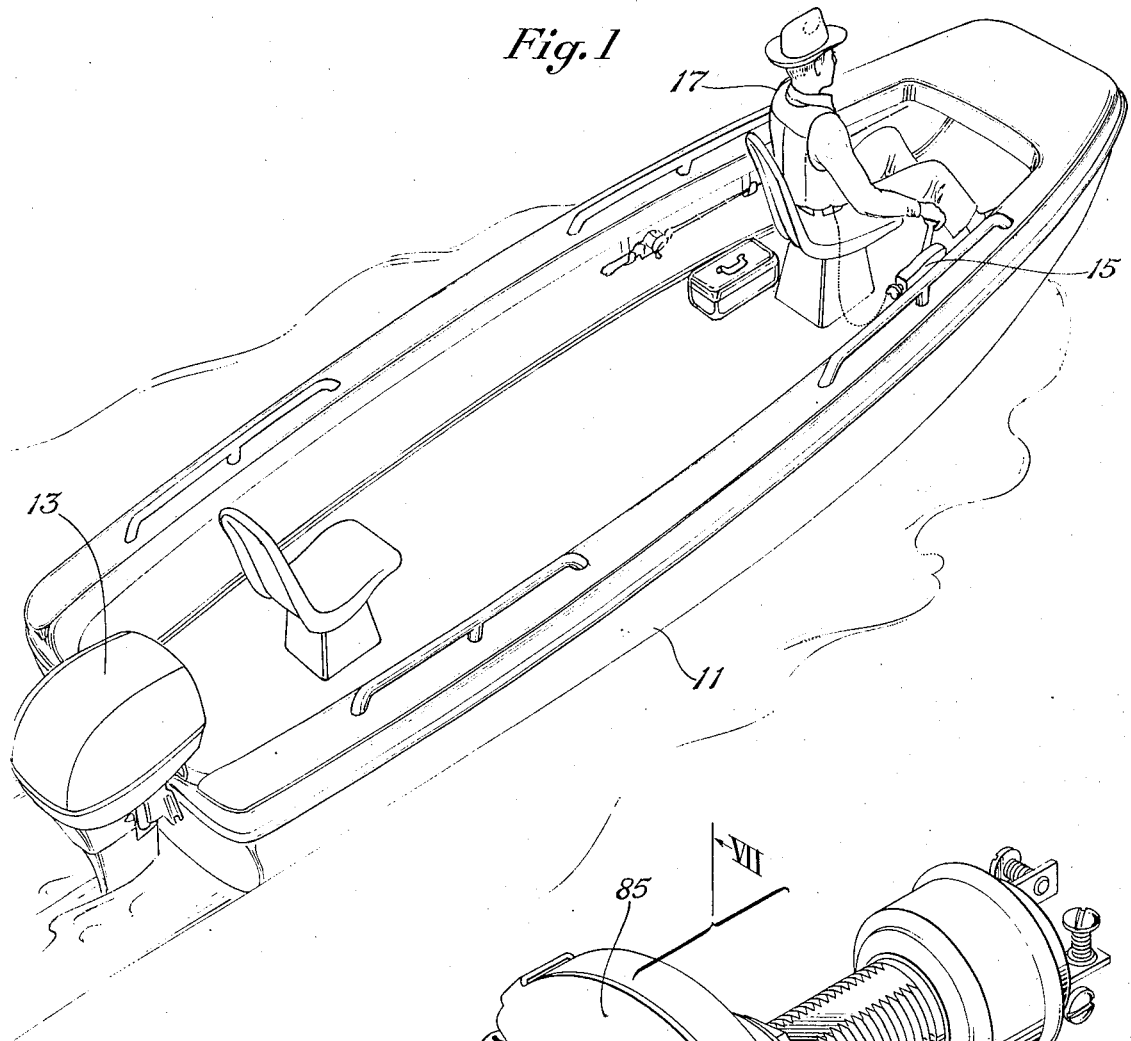
FIG. 1 illustrates a motor boat in which the present invention is employed.

Referring now to FIG. 1, there is illustrated a motor boat 11 driven by a high powered outboard motor 13. The boat is a conventional "fishing boat" having two seats, with the ignition switch and throttle control 15 located next to the front seat within access of the driver illustrated at 17. As is well known, boats of this type as well as other boats may be driven at high speed and since the driver sits at an elevated position, he may be thrown overboard in the event that the boat strikes a log or turns into a wave in a certain manner. In order to reduce the hazards to the driver as well as to other people and boats on the water, in the event that the driver is thrown overboard, the present invention is provided to automatically turn off the ignition switch key to immediately stop the motor and hence the boat.

Figure 2:
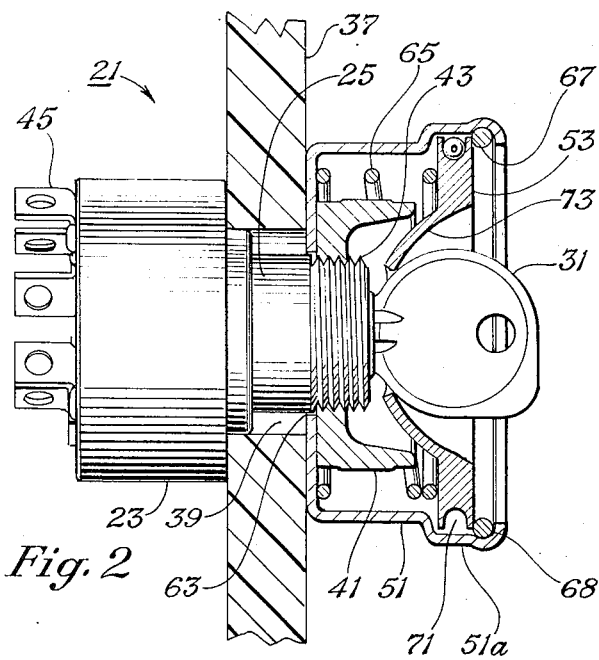
FIG. 2 is a cross-sectional view of one embodiment of the present invention attached to the housing of an ignition switch.
Figure 4:
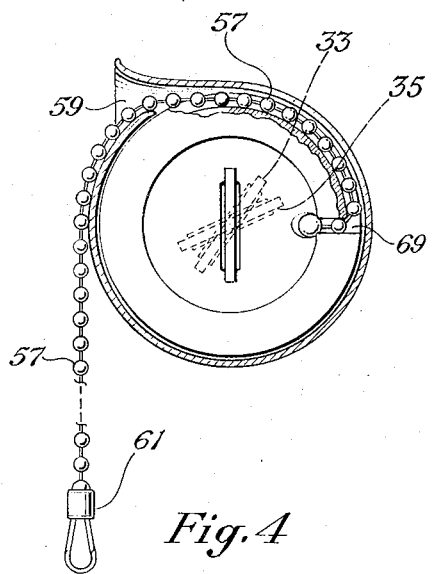
FIG. 4 is a front view of the device of FIG. 2.
Figure 3:
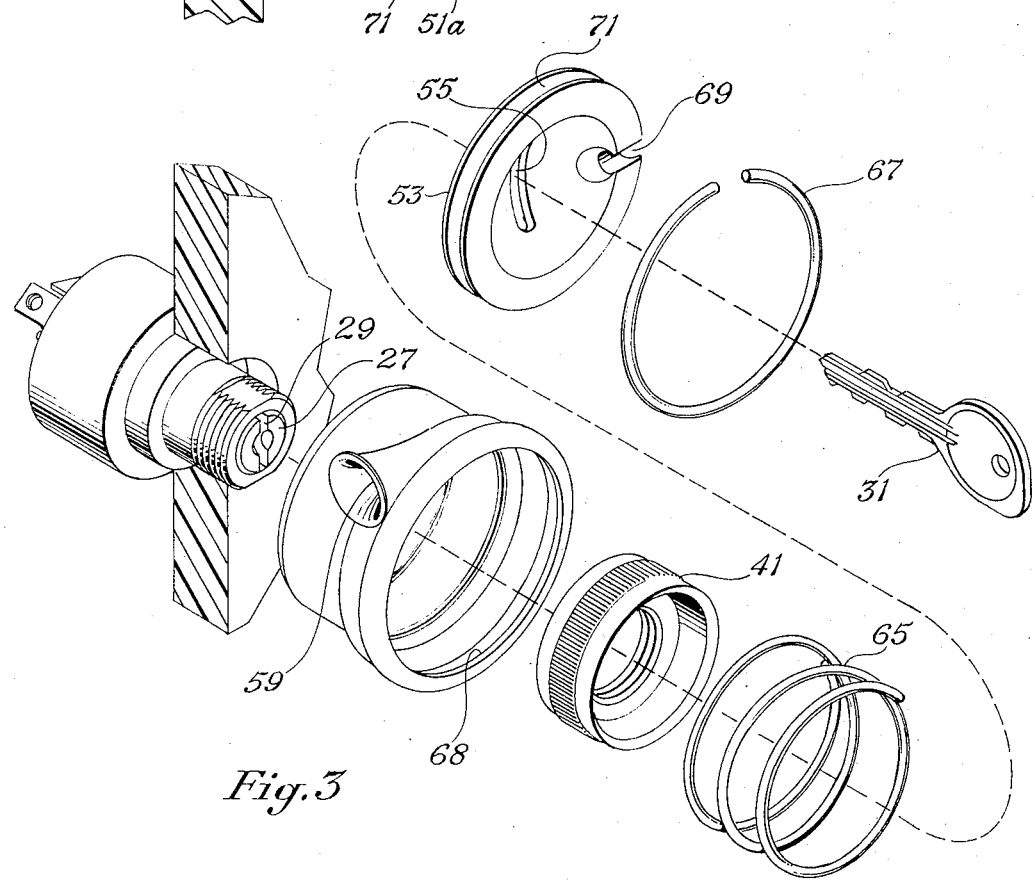
FIG. 3 is an exploded view of the device of FIG. 2.

Referring to FIGS. 2–4, there is illustrated a conventional ignition switch 21 for controlling the operation of an outboard motor. It comprises a housing 23 for supporting the switch contact elements (not shown) and a smaller diametered neck portion 25 for supporting a rotatable inner member 27 having a keyhole 29 for receving an ignition key 31. The key 31 is adapted to be inserted within the keyhole 29 and turned to three different positions for controlling the operation of the motor. These position are "off," "run," and "start." As illustrated in FIG. 4, the ignition switch housing generally is supported such that the off position is vertical while the run and start positions are clockwise from the off position. The run and start positions are illustrated by dotted outlines 33 and 35 respectively in FIG. 4. A spring is located within the housing whereby pressure is required to turn the key to the start position. After the key is released from the start position, the spring will bias it back to the run position. The key will remain in either the off or run position when turned thereto and released.

The ignition switch housing may be supported to a wall 37 of the control panel by inserting the neck portion 25 through an aperture 39 formed through the wall and threading a cup-shaped nut 41 to the threaded end 43 of the neck. Terminals 45 are provided for coupling the contact elements within the housing 23 to the electrical system of the boat.

The safety device of the present invention may be readily attached to the ignition switch housing for turning off the key 31 in the event that the operator is thrown from the boat. The safety device comprises a cup-shaped housing member 51 to be attached to the housing of the ignition switch and which is employed to support a circular control member 53 for rotational movement in front of the keyhole of the ignition switch. The control member 53 comprises a disc shaped member having a slot 55 for receiving the ignition switch key when the key is inserted into the ignition switch keyhole. When the key is inserted through the slot 55 and into the keyhole and turned to its off, run, and start positions, the control member 53 will turn with the key. Thus when the key is turned to the start position and then released to return to the run position, the slot 55 will be located clockwise from the off position. Coupled to the control member 53 is a flexible pull chain 57 which is adapted to extend through a flared opening 59 of the housing 51. The other end of the pull chain 57 has a clip 61 which is adapted to be connected to the driver for example to the driver's belt. Thus in the event that the driver is thrown from the boat or falls out of the boat, the force exerted on the pull chain 57 will rotate the control member 53 and hence the key 31 counterclockwise to the off position to cause the motor to turn off and stop the boat. Since the opening 59 is flared, the pull chain 57 may be pulled in all directions to effectively turn the key 31 to the off position.

The housing 51 has an opening 63 formed through its rear end to receive the neck portion 25 of the ignition switch housing. The control member 53 is supported for rotational movement in an enlarged portion 51A of the housing 51 by a coil spring 65 and a snap ring 67 held in an interior circular groove 68 at the front edge of the housing 51. The control member 53 has an aperture 69 for receiving and holding an end of the pull chain 57 and a groove 71 in its outer periphery for receiving and guiding the pull chain from aperture 69 to the flared opening 59.

The safety device may be readily connected in place to the ignition switch housing by removing the key 31; removing nut 41; fitting the housing 51 around the extending neck portion 25; threading the nut 41 to the threaded end 43; inserting the coil spring 65 and the control member 53 (with the pull chain 57 attached thereto) in place, and then fitting the snap ring 67 in its groove 68. As illustrated, the control member 53 has an indented or recessed portion 73 adapted to fit into the recessed portion of the nut 41 for providing sufficient space for allowing one to turn the key with his fingers.

In the embodiment of FIGS. 2–4, the ignition switch is of the type manufactured by Keikhaefer Mercury, Division of Brunswick Corporation, Fond Du Lac, Wisconsin 54935, model No. 54211. It is employed to control an outboard gasoline engine adapted to be started by a battery and which employs a magneto for providing current to the spark plugs. When the key is turned to the start position, the starter is actuated by the battery to start the motor. At the run position, the magneto is energized to apply current to the spark plugs for operating the engine. At the off position, the magneto is grounded to effectively turn off the engine. The electrical diagram for this system and a description thereof may be found on pages 124 and 125 of "Outboard Motor Service Manual, 4th Edition," volume 2, published by Abos Marine Division Technical Publications, 1014 Wyandotte Street, Kansas City, Missouri 64105, copyright 1967.

Figure 5:
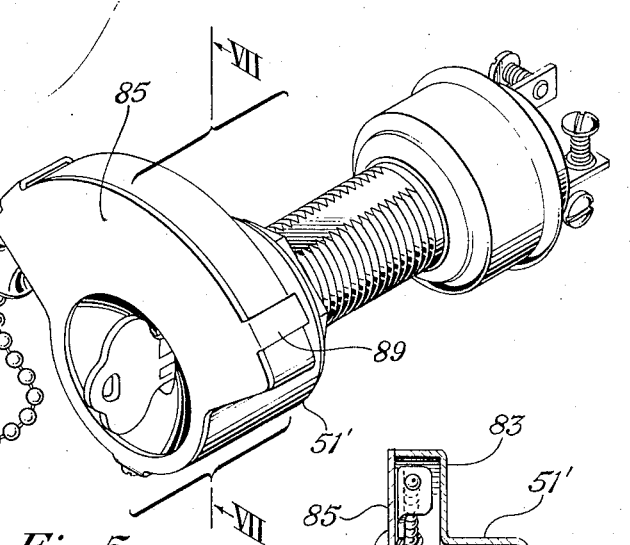
FIG. 5 is a perspective view of another embodiment of the present invention.
Figure 6:
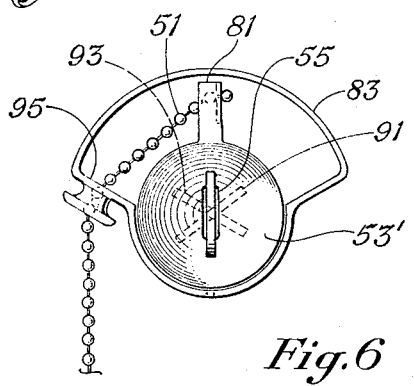
FIG. 6 is a front view of the device of FIG. 5 with the front cover removed.
Figure 7:
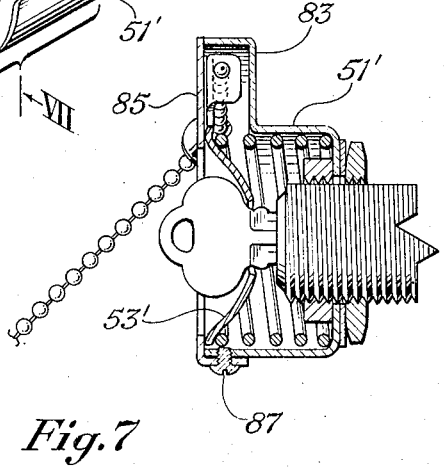
FIG. 7 is a cross-sectional view of FIG. 5 taken along the lines 7—7 thereof.

The embodiment of FIGS. 5–7 is similar to that of the embodiment of FIGS. 2–4 however the device is shown connected to a slightly different type of ignition switch and the control means 53' has an extending tab 81 to which the pull chain 57 is connected. The tab 81 is supported for rotation in an extended housing portion 83 extending from the cup-shaped housing 51'. Rather than employing a snap ring for holding the member 53' within the housing, a front cover 85 is coupled to the housing 51' by way of a bolt 87 and bent tabs 89. In FIG. 6, the key and hence the control member 53' is shown located in the run position. The start position is illustrated by dotted outline 91 while the off position is identified by dotted outline 93. The wall 95 will limit the movement of the tab 71 and hence of the control member 53' thereby minimizing the chances of the slot 55 from becoming out of alignment with the keyhole of the switch. The ignition switch of the embodiment of FIGS. 5–7 may be employed to control an outboard motor having an ignition coil for providing current for energizing the spark plugs. In the off position, the ignition switch terminates current flow to the ignition coil thereby stopping the motor. It will also have a run position and a start position as indicated previously. The electrical diagram of such a system and a description thereof is illustrated on page 125 of the aforementioned publication.

It is to be understood that the safety device of the present invention may be used on other types of ignition systems and other types of open top carriers. For example it may be used on ignition systems which employ a start button and an ignition switch controlled by a key which may be turned only to off and run positions. Other types of open top carriers in which the safety device may be used include tractors, riding mowers, snowmobiles, etc.

I claim:

1. An ignition switch cut-off device for use in an open top carrier powered by a motor adapted to operate when the ignition switch key is at a run position and to be turned off when the ignition switch key is turned to an off position, comprising:
    control means to be supported in front of the keyhole of the ignition switch housing,
    said control means having a slot for receiving the ignition switch key when the key is inserted into the ignition switch keyhole,
    housing means for supporting said control means for rotational movement in front of the ignition switch keyhole to allow the key to be inserted through said slot into the ignition switch keyhole and to turn with the key when it is turned to its run and off positions, and
    a flexible pull means coupled to said control means and adapted to extend out of said housing means in a manner such that when said key is at its run position and said pull means is pulled, said control means and hence the key will be pulled to its off position.

2. The device of claim 1 wherein said housing means comprises:
    a flared opening through which said pull means is adapted to extend for allowing said pull means to be pulled effectively from a plurality of directions to turn said control means and hence the key to its off position.

3. The device of claim 1 wherein said pull means comprises a flexible chain or cord adapted to be connected to a person in the boat whereby the key will be pulled to its off position by the cord or chain to turn off the boat's motor in the event that the person is thrown out of or falls out of the boat.

4. The device of claim 3 wherein said housing means comprises:
    a flared opening through which said pull means is adapted to extend for allowing said pull means to be pulled effectively from a plurality of directions to turn said control means and hence the key to its off position.

5. The device of claim 4 wherein:

said housing means comprises a generally cup-shaped member having a front opening and an aperture formed through its back end to be fitted around the extending male threaded portion of an ignition switch housing and to be attached thereto by a threaded nut member to be threaded to said male threaded portion on the inside of said housing means, said control means having a front side with an indented central portion through which said slot is formed, and means for supporting said control means in said housing means to face its front side outward through said front opening to provide an inward extending space within said indented portion to allow a person to turn the key to its on and off position.

* * * * *